INVENTOR.
JAMES P. KELTNER,
BY
McMorrow, Berman + Davidson
ATTORNEYS.

MAGNETIC DENSITY SERVO UNIT

Filed March 16, 1954 2 Sheets-Sheet 2

INVENTOR.
JAMES P. KELTNER,
BY
McMorrow, Berman + Davidson
ATTORNEYS.

United States Patent Office 2,758,484 Patented Aug. 14, 1956

2,758,484

MAGNETIC DENSITY SERVO UNIT

James P. Keltner, Seymour, Mo.

Application March 16, 1954, Serial No. 416,630

6 Claims. (Cl. 74—378)

This invention relates to servo systems, and more particularly to an improved servo system employing magnetic fluid clutches.

A main object of the invention is to provide a novel and improved servo system adapted to control the rotation of various objects in accordance with electrical signals furnished to the system, the system involving relatively simple components, being compact in size, and providing an accurate response to changes in the currents furnished thereto.

A further object of the invention is to provide an improved servo system adapted to control the rotation of heavy objects, such as ordnance, radar antennas, or the like, and being equally adapted for controlling the rotation of smaller objects, such as tuning devices or the like, the system involving inexpensive components, being reliable in operation, and being extremely sensitive.

A still further object of the invention is to provide an improved servo system for controlling the rotation of a shaft in accordance with the variation in signal currents furnished to the system, for example, for controlling the tuning of an oscillator in accordance with variations in the oscillator frequency, the improved system being substantially instantaneous in operation, being durable in construction, and being relatively light in weight.

Further objects and advantages of the invention will become apparent from the following description and claims, and from the accompanying drawings, wherein:

Figures 1, 2:
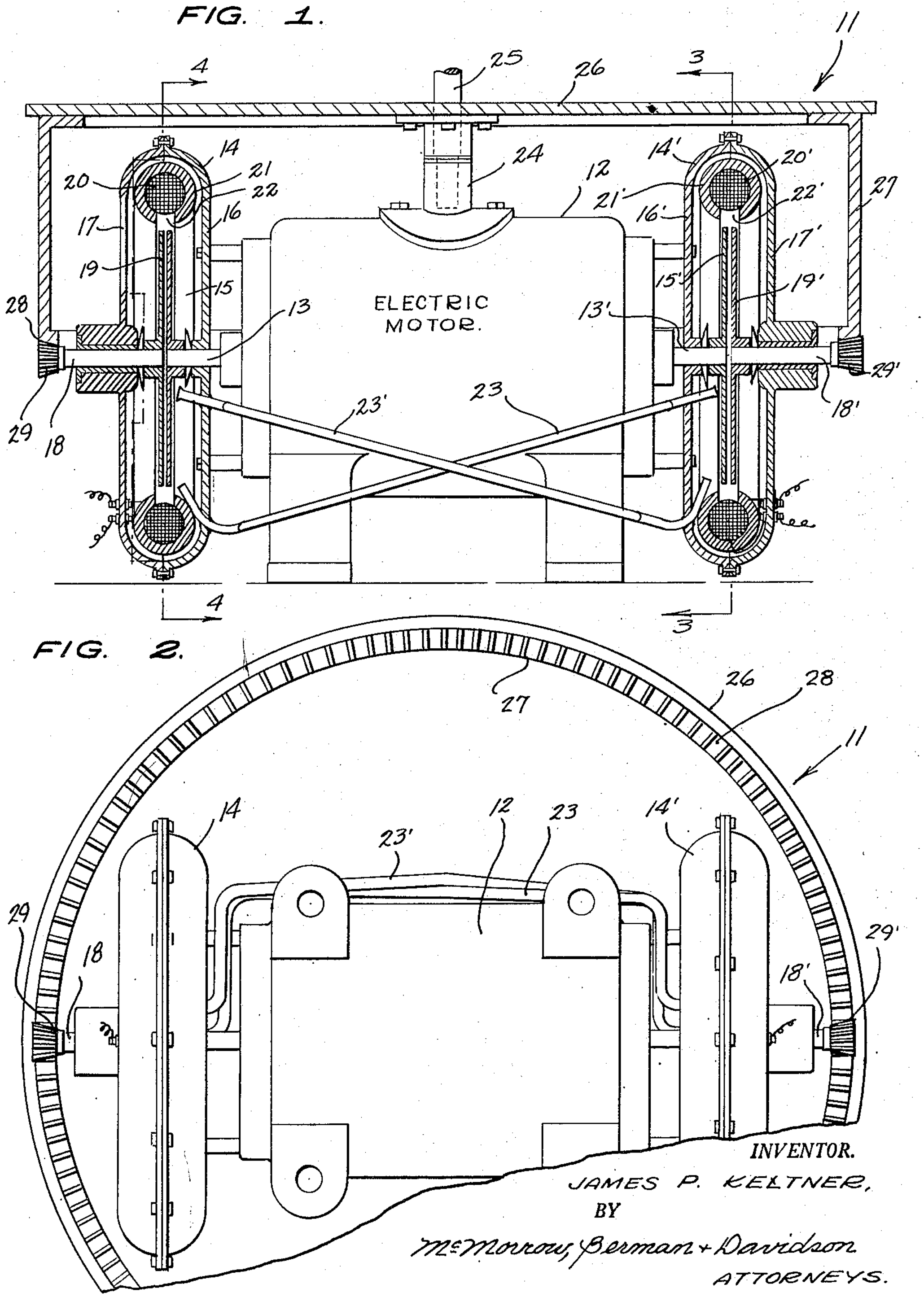
Figure 1 is a vertical cross sectional view taken longitudinally through an improved servo unit constructed in accordance with the present invention.
Figure 2 is a fragmentary bottom view of the servo unit shown in Figure 1.
Figures 3, 4, 5:
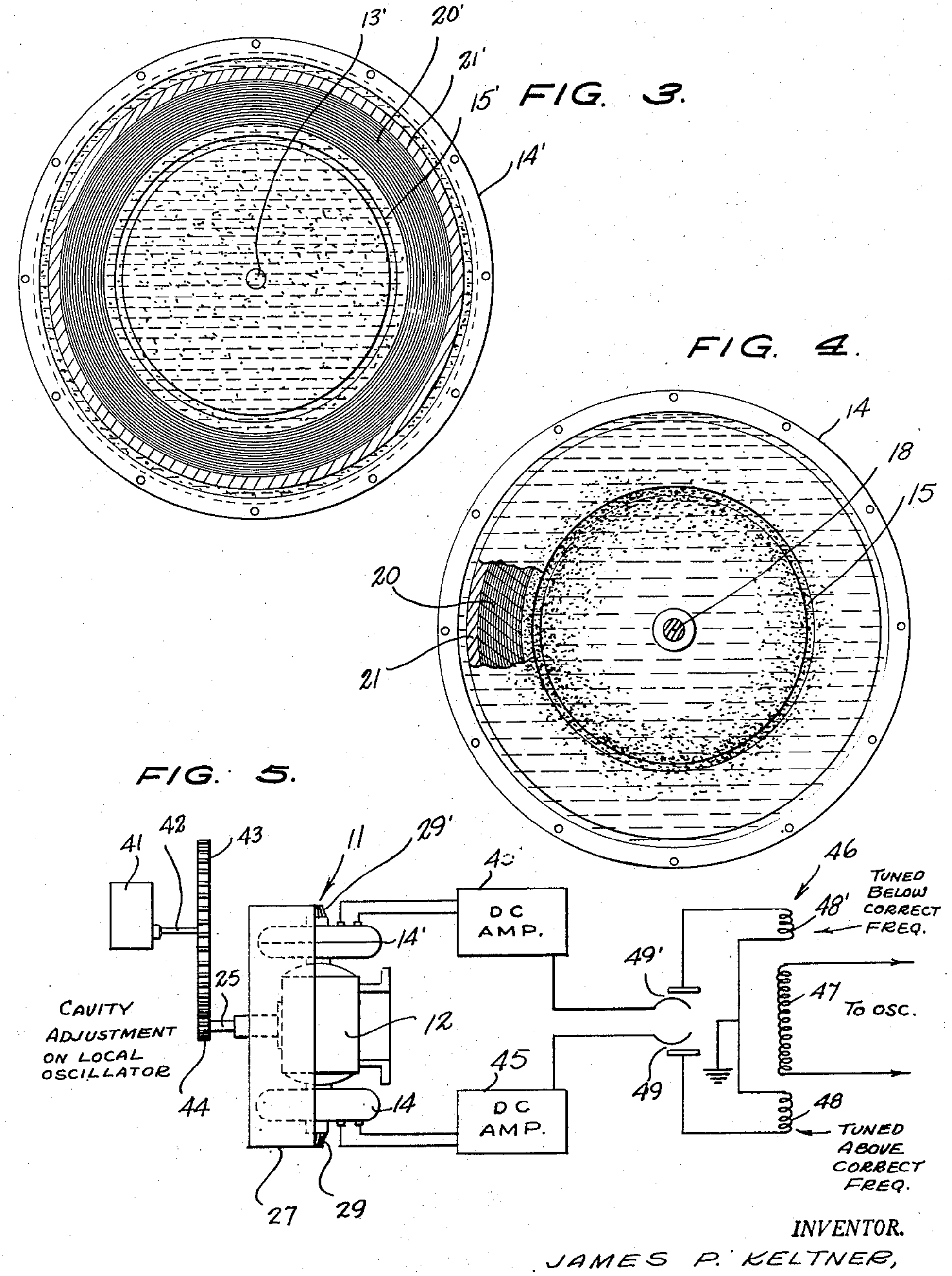
Figure 3 is a vertical cross sectional view taken on the line 3—3 of Figure 1.
Figure 4 is a vertical cross sectional view taken on the line 4—4 of Figure 1.
Figure 5 is a schematic block diagram showing the electrical connections of a servo unit such as that illustrated in Figures 1 to 4, employed to control the frequency of the local oscillator of a radar system.

Referring to the drawings, and more particularly to Figures 1 to 4, 11 designates a servo unit according to the present invention.

The unit 11 comprises a servo motor 12 having a shaft which projects from the opposite ends of the motor, as shown at 13 and 13′. Designated at 14 and 14′ are respective generally circular housings which are bolted to the respective ends of the motor 12 and which rotatably and sealingly receive the shaft ends 13 and 13′ through their respective adjacent side walls 16 and 16′. Secured on the end of the shaft element 13 is a disc 15 of magnetic material, and secured on the end of the shaft element 13′ in the housing 14′ is a similar disc 15′ also af magnetic material. Sealingly journaled in the outer walls 17 and 17′ of the respective housings 14 and 14′ are respective output shafts 18 and 18′. Secured on the inner ends of the shafts 18 and 18′ are the respective driven magnetic discs 19 and 19′ which are located adjacent to, parallel with, but spaced from the magnetic drive discs 15 and 15′, the output shafts 18 and 18′ being in axial alignment with the motor shaft ends 13 and 13′, as shown in Figure 1.

Secured in the respective housings 14 and 14′ concentric with and extending around the peripheries of the respective pairs of discs 15, 19 and 15′, 19′ are the respective annular coils 20 and 20′, said coils being provided with the annular shells 21 and 21′ which are open at their inner portions, as shown at 22 and 22′.

The housings 14 and 14′ are filled with suitable clutch fluid containing magnetic particles, similar to that employed in conventional magnetic fluid clutches. The lower portion of the housing 14 is connected to the intermediate portion of the housing 14′ by a conduit 23, and similarly, the lower portion of the housing 14′ is connected to the intermediate portion of the housing 14 by a conduit 23′, whereby substantial equalization of fluid pressures in the respective housings 14 and 14′ is maintained.

As is well understood, when the coils 20 and 20′ are not magnetized, no torque is transmitted from the discs 15, 15′ to the discs 19, 19′. However, when the coils 20 and 20′ are energized, magnetizing forces are produced by said coils which cause the particles of magnetic material in the clutch fluid to move to the regions between the clutch plates 15, 19 and 15′, 19′, thus producing conditions whereby torque may be transmitted from the drive discs 15, 15′ to the driven discs 19, 19′.

Mounted on the servo motor 12 is an upstanding bearing bracket 24 which rotatably receives the lower end of a vertical shaft 25 which is connected to the device to be controlled. Secured on the shaft 25 is the disc 26 and secured to the peripheral portion of the disc 26 is the ring gear 27 having the beveled gear teeth 28. Secured on the ends of the respective output shafts 18 and 18′ are the beveled pinion gears 29, 29′ which mesh with the beveled ring gear teeth 28.

The coils 20 and 20′ are identical in construction, and when equal currents are supplied to said coils, the coils produce equal magnetizing forces in the magnetic clutch housings 14 and 14′, whereby the motor shaft ends 13 and 13′ develop equal and opposite torques on the respective output shafts 18 and 18′ by the transmission of the motor torques through the respective magnetic fluid clutches. Thus, the ring gear 27 remains stationary and the magnetic driving discs 15, 15′ slip with respect to their adjacent magnetic discs 19 and 19′. However, if more current passes through one of the coils than through the other, the magnetic particles in the housing containing the said one coil will become more concentrated in the region of the clutch plates in said housing than in the other coil, thereby transmitting more torque than is transmitted by the magnetic fluid in the housing containing the coil receiving lesser current. Thus the torque produced by one of the pinions 29, 29′ on the ring gear 27 is greater than that produced by the other, producing an unbalance which causes the disc 26 and shaft 25 to rotate.

From the above it will be seen that the rotation of the shaft 25 may be controlled by producing a difference in current in the coils 20 and 20′, and the direction of rotation will, of course, depend upon which coil carries the greater current. The current to the coils 20 and 20′ may be controlled by suitable switching means, or by the use of electronic amplifiers so that a relatively small control voltage may be employed to control the rotation of a heavy object connected to the shaft 25.

The conduits 23 and 23′ interconnect the housings 14 and 14′ in such a manner that the oil or other fluid employed in the housings will circulate between the housings so as to keep the oil or other fluid at the same consistency in both clutches. It will be apparent that the oil will be moved by centrifugal action outwardly in the housing 14 and will enter the conduit 23, and be circulated thence to the intermediate portion of the housing 14', whereupon the oil will be moved outwardly in the housing 14' by centrifugal action and will enter the conduit 23' and be returned to the intermediate portion of housing 14, thus providing continuous circulation of the liquid.

The servo unit illustrated in Figures 1 to 4 is obviously of general application. However, Figure 5 illustrates a specific application of the unit employed to control the frequency of a local oscillator tube in a radar system. In Figure 5, 41 designates the tuning cavity of the radar local oscillator and 42 designates the frequency adjustment screw of the local oscillator cavity 41. Secured on the screw 42 is the relatively large gear 43 which meshes with a small gear 44 mounted on the driven shaft 25 of the servo unit 11. Designated at 45 and 45' are respective electronic amplifiers which supply current to the respective coils 20 and 20' mounted in the clutch housings 14 and 14'. Designated generally at 46 is a discriminator having the primary coil 47 and the respective secondary coils 48 and 48' coupled in a conventional manner to the primary coil 47. The coil 47 is connected in any suitable manner to the oscillator so as to receive the oscillator output current. The secondary coil 48 is tuned to a frequency slightly above the correct frequency of the oscillator, whereas the secondary coil 48' is tuned to a frequency slightly below the correct oscillator frequency by the same amount. The secondary coils 48 and 48' are connected to the input circuits of the respective amplifiers 45 and 45' through respective diodes 49 and 49', as shown.

When the oscillator is operating at its correct frequency, the amplifiers 45 and 45' receive equal signals from the secondary coils 48 and 48', whereby the amplifiers furnish equal currents to the clutch coils 20 and 20'. Therefore, under these conditions, the shaft 25 does not rotate and the adjustment screw 42 is maintained stationary. However, if the oscillator frequency drifts, for example, decreases in value, a larger signal is furnished by the secondary winding 48 to the amplifier 45 than is furnished by the secondary winding 48' to the amplifier 45', causing the servo motor 12 to transmit more torque to the clutch housing 14 than is transmitted to the clutch housing 14' in the manner above explained. This causes the shaft 25 to rotate in the proper direction to rotate the cavity adjustment shaft 42 in a direction to increase the oscillator frequency to its proper value. As soon as the oscillator has arrived at its proper frequency value, the signals delivered to the amplifiers 45 and 45' become equal, terminating the operation of the servo unit.

A similar action occurs when the oscillator frequency drifts to a value higher than its correct value. When this occurs, the secondary coil 48' delivers a larger signal to the amplifier 45' than is delivered by the secondary winding 48 to the amplifier 45, causing the servo unit to rotate its shaft 25 and to return the cavity 41 to its proper adjustment value to restore the oscillator frequency to the correct value.

While a specific embodiment of an improved servo system has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A servo system comprising a servo motor having a shaft projecting from the opposite ends of the motor, respective housings rotatably and sealingly receiving the shaft ends, respective magnetic drive discs mounted on said shaft ends in the respective housings, respective output shafts sealingly journaled in the housings in axial alignment with the respective shaft ends and projecting outside the housings, respective magnetic driven discs mounted on the output shafts in the housings adjacent to but spaced from the drive discs, respective magnetizing coils mounted in the housings around the discs, clutch fluid containing magnetic particles in the respective housings, respective pinion gears mounted on the outer ends of the output shafts, support means, a ring gear rotatably mounted on said support means, and means for simultaneously supplying respective currents to said coils to develop respective magnetizing forces therein acting to cause the magnetic particles in the clutch fluid to simultaneously transmit torque from the drive discs to the driven discs, whereby said ring gear will rotate when said coils develop different magnetizing forces in the respective housings as the result of differing simultaneous currents in the coils.

2. A servo system comprising a servo motor having a shaft projecting from the opposite ends of the motor, respective housings rotatably and sealingly receiving the shaft ends, respective magnetic drive discs mounted on said shaft ends in the respective housings, respective output shafts sealingly journaled in the housings in axial alignment with the respective shaft ends and projecting outside the housings, respective magnetic driven discs mounted on the output shafts in the housings adjacent to but spaced from the drive discs, respective annular magnetizing coils mounted in the housings concentric with and extending around the peripheries of the discs, clutch fluid containing magnetic particles in the respective housings and surrounding the discs, respective pinion gears mounted on the outer ends of the output shafts, a ring gear rotatably mounted on said motor and meshing with said pinion gears, and means for simultaneously supplying respective currents to said coils to develop respective magnetizing forces therein acting to cause the magnetic particles in the clutch fluid to simultaneously transmit torque from the drive discs to the driven discs, whereby said ring gear will rotate when said coils develop different magnetizing forces in the respective housings as a result of differing simultaneous currents in the coils.

3. A servo system comprising a servo motor having a shaft projecting from the opposite ends of the motor, respective housings rotatably and sealingly receiving the shaft ends, respective magnetic drive discs mounted on said shaft ends in the respective housings, respective output shafts sealingly journaled in the housings in axial alignment with the respective shaft ends and projecting outside the housings, respective magnetic driven discs mounted on the output shafts in the housings adjacent to but spaced from the drive discs, respective annular magnetizing coils mounted in the housings concentric with and extending around the peripheries of the discs, clutch fluid containing magnetic particles in the respective housings and surrounding the discs, respective pinion gears mounted on the outer ends of the output shafts, a ring gear rotatably mounted on said motor and meshing with said pinion gears, means for simultaneously supplying respective currents to said coils to develop respective magnetizing forces therein acting to cause the magnetic particles in the clutch fluid to simultaneously transmit torque from the drive discs to the driven discs, whereby said ring gear will rotate when said coils develop different magnetizing forces in the respective housings as the result of differing simultaneous currents in the coils, and a servo output shaft connected to said ring gear.

4. A servo system comprising a servo motor having a shaft projecting from the opposite ends of the motor, respective housings rotatably and sealingly receiving the shaft ends, respective magnetic drive discs mounted on said shaft ends in the respective housings, respective output shafts sealingly journaled in the housings in axial alignment with the respective shaft ends and projecting outside the housings, respective magnetic driven discs mounted on the output shafts in the housings adjacent to but spaced from the drive discs, respective magnetizing coils mounted in the housings around the discs, clutch fluid containing magnetic particles in the respective housings, respective pinion gears mounted on the outer ends of the output shafts, support means, a ring gear rotatably mounted on said support means, means for simultaneously supplying respective currents to said coils to develop respective magnetizing forces therein acting to cause the magnetic particles in the clutch fluid to simultaneously transmit torque from the drive discs to the driven discs, whereby said ring gear will rotate when said coils develop different magnetizing forces in the respective housings as the result of differing simultaneous currents in the coils, and conduit means interconnecting said housings.

5. A servo system comprising a first current source, a second current source, a servo motor having a shaft projecting from the opposite ends of the motor, respective housings rotatably and sealingly receiving the shaft ends, respective magnetic drive discs mounted on said shaft ends in the respective housings, respective output shafts sealingly journaled in the housings in axial alignment with the respective shaft ends and projecting outside the housings, respective magnetic driven discs mounted on the output shafts in the housings adjacent to but spaced from the drive discs, respective magnetizing coils mounted in the housings around the discs, circuit means connecting said respective current sources to the respective coils arranged to simultaneously supply current thereto, clutch fluid containing magnetic particles in the respective housings, respective pinion gears mounted on the outer ends of the output shafts, support means, and a ring gear rotatably mounted on said support means, said coils being adapted to simultaneously develop magnetizing forces acting to cause the magnetic particles in the clutch fluid to transmit torque from the drive discs to the driven discs, whereby said ring gear will rotate when said coils develop different magnetizing forces in the respective housings as the result of differing currents supplied simultaneously to the coils by said respective current sources.

6. A servo system comprising a first current source, a second current source, respective magnetic fluid clutches, each having a magnetizing coil connected to a respective one of said current sources, said current sources being arranged to supply current simultaneously to said coils, a servo motor having the opposite ends of its shaft drivingly coupled to the respective input shafts of the respective magnetic fluid clutches, a servo shaft, a ring gear connected to said servo shaft, and respective pinions on the output shafts of the magnetic fluid clutches meshing with said ring gear and being arranged to rotate said ring gear in response to a difference in the currents furnished simultaneously by said current sources to the respective magnetizing coils.

References Cited in the file of this patent

UNITED STATES PATENTS

| | | |
|---|---|---|
| 1,614,819 | Bauer et al. | Jan. 18, 1927 |
| 1,909,918 | Tanner | May 16, 1933 |
| 2,452,575 | Kenney | Nov. 2, 1948 |
| 2,545,296 | Mittelmann | Mar. 13, 1951 |
| 2,590,029 | Minorsky | Mar. 18, 1952 |
| 2,718,602 | Landis | Sept. 20, 1955 |

OTHER REFERENCES

Publications:

Magnetic Fluid Clutch in Servo Applications—Electronics, November 1949, pages 100–103.

Characteristics of Some Magnetic Fluid Clutch Servo Mechanism, AIEE Technical Paper 50–24, published December 1949.